United States Patent
Coan et al.

(10) Patent No.: US 7,062,232 B2
(45) Date of Patent: Jun. 13, 2006

(54) SWITCHED ANTENNA TRANSMIT DIVERSITY

(75) Inventors: Philip D. Coan, San Diego, CA (US); Harris S. Simon, Poway, CA (US); Michael J. Wengler, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 10/317,295

(22) Filed: Dec. 11, 2002

(65) Prior Publication Data

US 2004/0203541 A1    Oct. 14, 2004

(51) Int. Cl.
*H04B 1/02* (2006.01)

(52) U.S. Cl. .............. 455/101; 455/522; 455/127.1; 455/91

(58) Field of Classification Search .......... 455/562.1, 455/561, 277.1, 132, 276.1, 277.2, 101, 522, 455/91, 129, 95, 127.1, 127.4, 127.3, 127.2, 455/127.5; 375/299
See application file for complete search history.

(56) References Cited

U.S. PATENT DOCUMENTS

| 5,437,055 A * | 7/1995 | Wheatley, III ............ 455/276.1 |
| 5,960,330 A * | 9/1999 | Azuma ........................ 455/522 |
| 6,108,526 A * | 8/2000 | van der Plas ............ 455/277.1 |
| 6,118,773 A * | 9/2000 | Todd ........................ 455/277.2 |
| 6,690,652 B1 * | 2/2004 | Sadri .......................... 455/522 |
| 6,690,927 B1 * | 2/2004 | Hupp et al. ............... 455/277.1 |
| 6,947,469 B1 * | 9/2005 | Anderson et al. ............ 455/101 |
| 2001/0024964 A1 * | 9/2001 | Wang et al. ................. 455/562 |
| 2001/0031015 A1 * | 10/2001 | West et al. .................. 375/260 |
| 2002/0115473 A1 * | 8/2002 | Hwang et al. .............. 455/562 |
| 2002/0122460 A1 * | 9/2002 | Lomp ........................ 455/522 |
| 2003/0035491 A1 * | 2/2003 | Walton et al. .............. 455/132 |
| 2003/0064743 A1 * | 4/2003 | Chen ......................... 455/522 |
| 2004/0087332 A1 * | 5/2004 | Monroe et al. ............. 455/101 |

FOREIGN PATENT DOCUMENTS

| EP | 0 987 842 A1 | 3/2000 |
| WO | 00/41339 | 7/2000 |
| WO | 02/093819 A1 | 11/2002 |

OTHER PUBLICATIONS

Raitola et al., "Transmission Diversity in Wideband CDMA," Vehicular Technology Conference, 1999 IEEE, Houston, Texas, U.S.A., May 16, 1999, pp. 1545-1549.

* cited by examiner

*Primary Examiner*—Lana Le
(74) *Attorney, Agent, or Firm*—Philip Wadsworth; Sandra L. Godsey

(57) ABSTRACT

Systems and techniques are disclosed relating to communications. The systems and techniques involve transmitting a signal through a first antenna, receiving feedback related to the signal transmission through the first antenna, selecting between the first antenna and a second antenna as a function of the feedback, and transmitting the signal through the selected antenna. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

27 Claims, 4 Drawing Sheets

SWITCHED ANTENNA TRANSMIT DIVERSITY

BACKGROUND

1. Field

The present invention relates generally to communications, and more specifically, to communication devices with switched antenna transmit diversity.

2. Background

In wireless communications, transmitted signals are reflected and scattered by obstacles in their path, often resulting in multiple copies of the signal arriving at the receiver at different times. Depending on the location of the receiving antenna relative to the transmitting antenna, and the obstacles in the signal path, the multiple copies of the signal may combine constructively or destructively at the receiving antenna. In narrow band mobile applications, this phenomenon may cause fluctuations in the signal when the user travels even a small distance. This is often referred to as fast fading. The use of a wide band code division multiple access (CDMA) signal may significantly reduce the impact of fast fading. CDMA is a modulation and multiple access scheme based on spread-spectrum communications which is well known in the art.

Another technique to mitigate fast fading in mobile applications is to use multiple antennas to increase the gain of the signal due to spatial diversity of the antennas. Currently, there are a number of commercially available mobile devices with dual antenna arrangements. However, these mobile devices employ spatial diversity combining techniques for the received signal only, using a single antenna to transmit. In these mobile devices, it would be advantageous to employ a methodology that uses both antennas to achieve transmit antenna diversity.

SUMMARY

In one aspect of the present invention, a method of communications includes transmitting a signal through a first antenna, receiving feedback related to the signal transmission, selecting between the first antenna and a second antenna as a function of the feedback, and transmitting the signal through the selected antenna.

In another aspect of the present invention, a communications apparatus configured to transmit a signal to a remote source includes first and second antennas, an antenna selection module responsive to feedback from the remote source, the feedback being related to the signal transmission, and a transmitter selectively coupled between the first and second antennas under control of the antenna selection module.

In yet another aspect of the present invention, computer readable media embodying a program of instructions executable by a computer program performs a method of transmitting a signal to a remote source, the method including receiving feedback relating to the signal transmission, selecting between the first antenna and a second antenna as a function of the feedback, and generating a signal to couple a transmitter to the selected antenna.

In a further aspect of the present invention, a communications apparatus configured to transmit a signal to a remote source includes first and second antennas, means for selecting between the first and second antennas as a function of feedback received from the remote source, the feedback being related to the signal transmission, a transmitter, and means for coupling the transmitter to the selected antenna.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings wherein.

DETAILED DESCRIPTION

The detailed description set forth below in connection with the appended drawings is intended as a description of exemplary embodiments of the present invention and is not intended to represent the only embodiments in which the present invention may be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In the following detailed description, various techniques will be described in the context of a CDMA communications system. While these techniques may be well suited for use in this environment, those skilled in the art will readily appreciate that these techniques are likewise applicable to other wireless networks. Accordingly, any reference to a CDMA communications system is intended only to illustrate various inventive aspects of the present invention, with the understanding that these inventive aspects have a wide range of applications.

Figure 1:
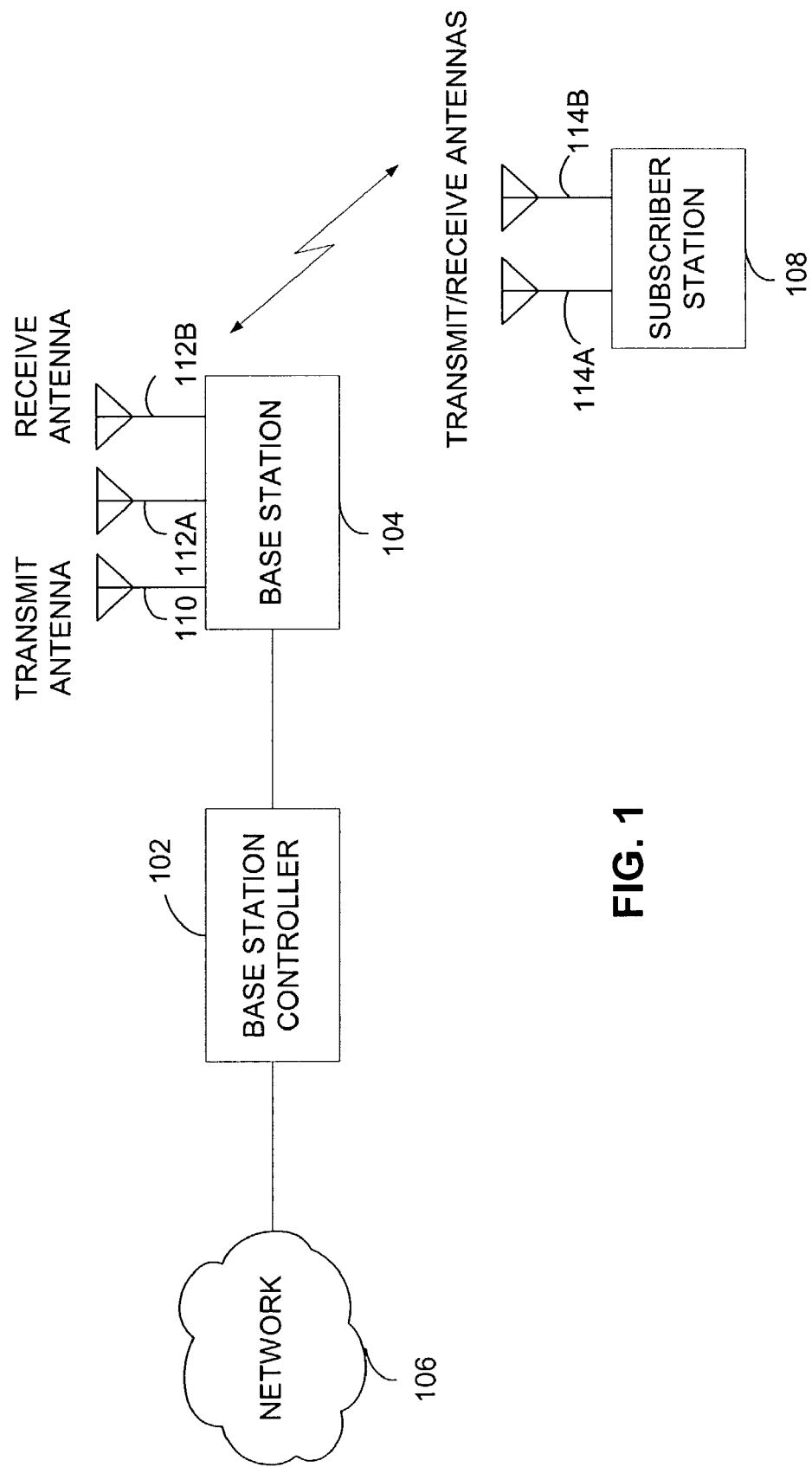
FIG. 1 is a conceptual block diagram of an exemplary CDMA communications system.

FIG. 1 is a conceptual block diagram of an exemplary CDMA communications system. A base station controller 102 may be used to provide an interface between a network 106 and all base stations dispersed throughout a geographic region, such as Base Station (BS) 104. The geographic region is generally divided into smaller regions known as cells. Each cell typically includes a base station capable of serving all subscriber stations in that cell. In more densely populated regions, the cell may be divided into sectors with a base station serving each sector. For ease of explanation, only one base station 104 is shown. A subscriber station 108 may access the network 106, or communicate with other subscriber stations, through one or more base stations under control of the base station controller 102.

The base station 104 may be equipped with any number of antennas depending on the particular application and overall design constraints. In the CDMA communications system shown in FIG. 1, the base station 104 includes a transmit antenna 110 and two receive antennas 112A and 112B. The two receive antennas 112A and 112B may be used by the base station 104 to receive a signal transmission from the subscriber station 108. This approach increases the gain of the signal transmission due to the spatial diversity of the receive antennas 112A and 112B and the combining techniques employed by the base station 104. The transmit and receive antennas 110, 112A, 112B may be spatially separated individual radiating elements such as dipoles, open-ended waveguides, slots cut in waveguides, or any other type of radiating elements.

The subscriber station 108 is shown with a dual antenna arrangement; however, as those skilled in the art will appreciate the subscriber station 108 may be configured with any number of antennas. The two antennas 114A and 114B may be embedded in the subscriber station 108. This approach enhances the aesthetics of the subscriber station as well as provides increased user convenience by eliminating the need to deploy the antennas during use. Alternatively, the two antennas 114A and 114B may be whips, helices, or any other type of radiating elements.

In the exemplary embodiment shown in FIG. 1, the two antennas 114A and 114B may be used to provide spatial diversity for the received signal on the forward link transmission. The forward link refers to a signal transmission from the base station 104 to the subscriber station 108. The two antennas 114A and 114B may also be used to support switched transmit diversity on the reverse link. The reverse link refers to a signal transmission from the subscriber station 108 to the base station 104. Switched diversity may be affected by optimally switching the reverse link signal transmission between the two antennas 114A and 114B in accordance with a control procedure.

The control procedure may be implemented in various ways depending on the particular application, overall design constraints, and/or other relevant factors. In at least one embodiment of the subscriber station, feedback from the base station 104 may be used to optimally switch the signal transmission between the two antennas 114A and 114B. The feedback may take on various forms, but should generally provide some indication of the reverse link signal quality. The feedback may be any reverse link quality metric computed at the base station and fed back to the subscriber station over an air traffic or overhead channel. Examples of reverse link quality metrics include the bit energy-to-noise density ($E_b/I_o$), the bit error rate (BER), the frame error rate (FER), the carrier-to-interference ratio (C/I), or any other known parameter. Alternatively, the subscriber station may utilize existing feedback loops in conventional CDMA communication systems. By way of example, a power control loop used by conventional subscriber stations to control the power of the reverse link transmission may be used to control the switching of the antennas.

Figure 2:
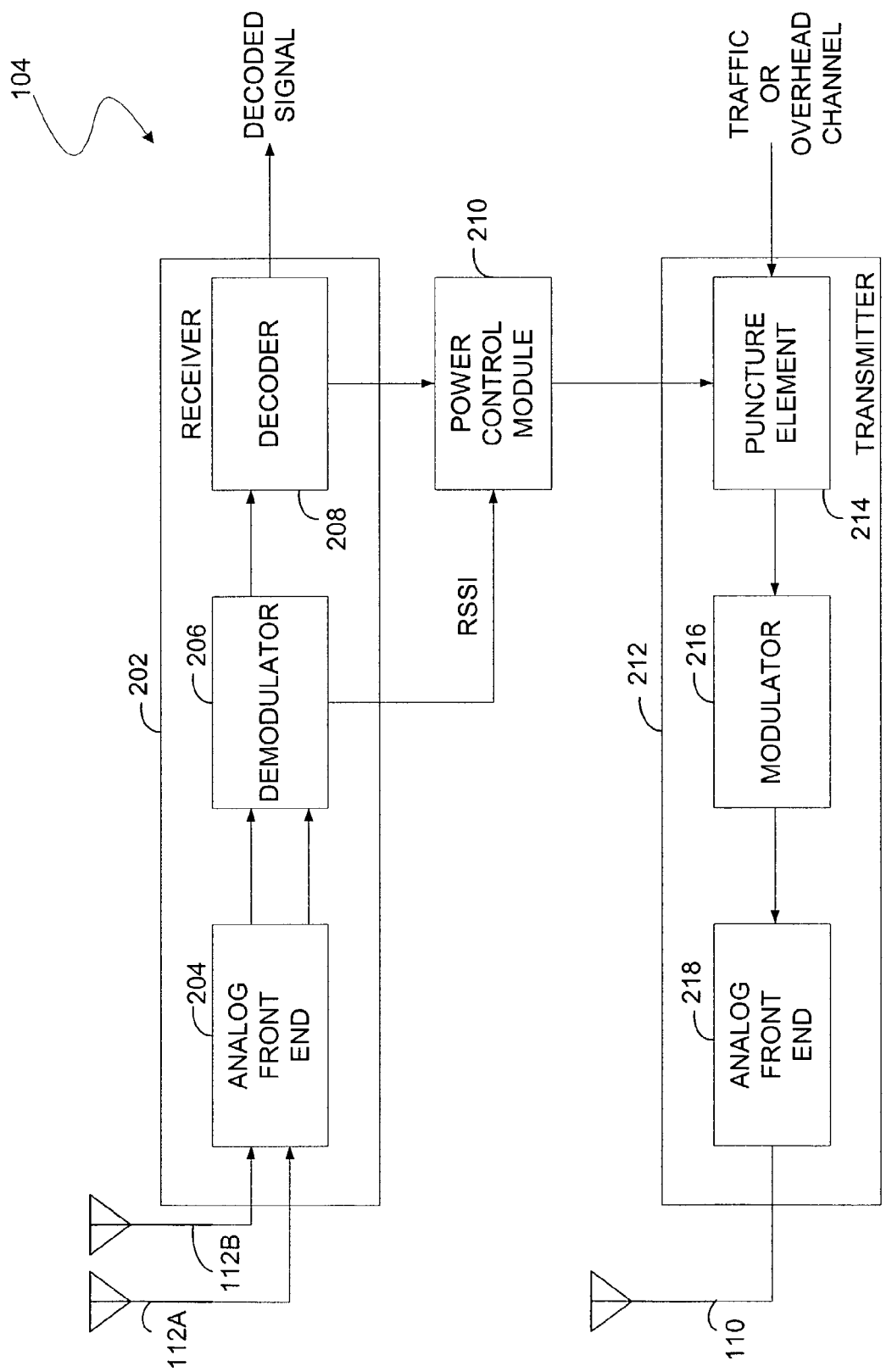
FIG. 2 is a simplified functional block diagram of an exemplary base station supporting a power control loop.

FIG. 2 is a simplified functional block diagram of an exemplary base station 104 supporting a power control loop. The base station 104 includes two receive antennas 112A and 112B coupled to a receiver 202. The receiver 202 includes various high frequency and signal processing components, however, only those components pertinent to the inventive concepts described throughout this disclosure will be discussed. An analog front end 204 may be used to amplify, filter and downconvert the signals received by the antennas 112A and 112B to baseband signals. The baseband signals from the antennas 112A and 112B may be separately demodulated and then combined with a rake receiver (not shown) in a demodulator 206. A decoder 208 may be used to de-interleave and decode the combined signal from the demodulator 206.

The demodulator 206 may also be used to generate a received signal strength indicator (RSSI) for the reverse link transmission from the combined signal. The RSSI may be provided to a power control module 210 where it may be compared to a power set point to produce a power control signal. The power control signal may be used as a feedback signal by the subscriber station to increase the reverse link transmission power if the RSSI is less than the power set point, and decrease the reverse link power if the RSSI is more than the power set point. Because the power set point is typically determined from the FER of the decoded signal, it has a direct correlation to the reverse link signal quality. Accordingly, the power control signal is a good choice for controlling the switching of the antennas at the subscriber station during reverse link signal transmissions.

The power set point is a threshold value against which the measured signal strength, specifically RSSI in the present embodiment, is compared. Alternate embodiments may use alternate measures of signal strength or signal quality and employ an alternate threshold metric. In one embodiment, multiple thresholds are used to determine increases and/or decreases in transmit power on the reverse link. For example, the use of one threshold to determine decreases in transmit power and the use of a different lower threshold to determine increases in transmit power. Another example may incorporate multiple ranges, wherein the ranges are associated with control information regarding the transmit power adjustment. In this way, if the measured RSSI is within a given range, such range indicates an increase in transmit power by a predetermined amount. Other ranges may indicate other adjustment amounts. Similarly, the control values of each range may be dynamically adjusted based on the current values of another range. Historical information may determine changes in the control values, such as changes in the threshold values and/or ranges, as well as changes in the associated control decisions.

The power control signal may be provided to a transmitter 212. The transmitter 212 includes various high frequency and signal processing components, however, only those components pertinent to the inventive concepts described throughout this disclosure will be discussed. A puncture element 214 in the transmitter 212 may be used to puncture the power control signal from the power control module 210 into a traffic channel or overhead channel. The traffic or overhead channel from the puncture element 214 may then be provided to a modulator 216 before being upconverted to a carrier frequency, filtered and amplified by an analog front end 218 for transmission on the forward link via the transmit antenna 110.

Figure 3:
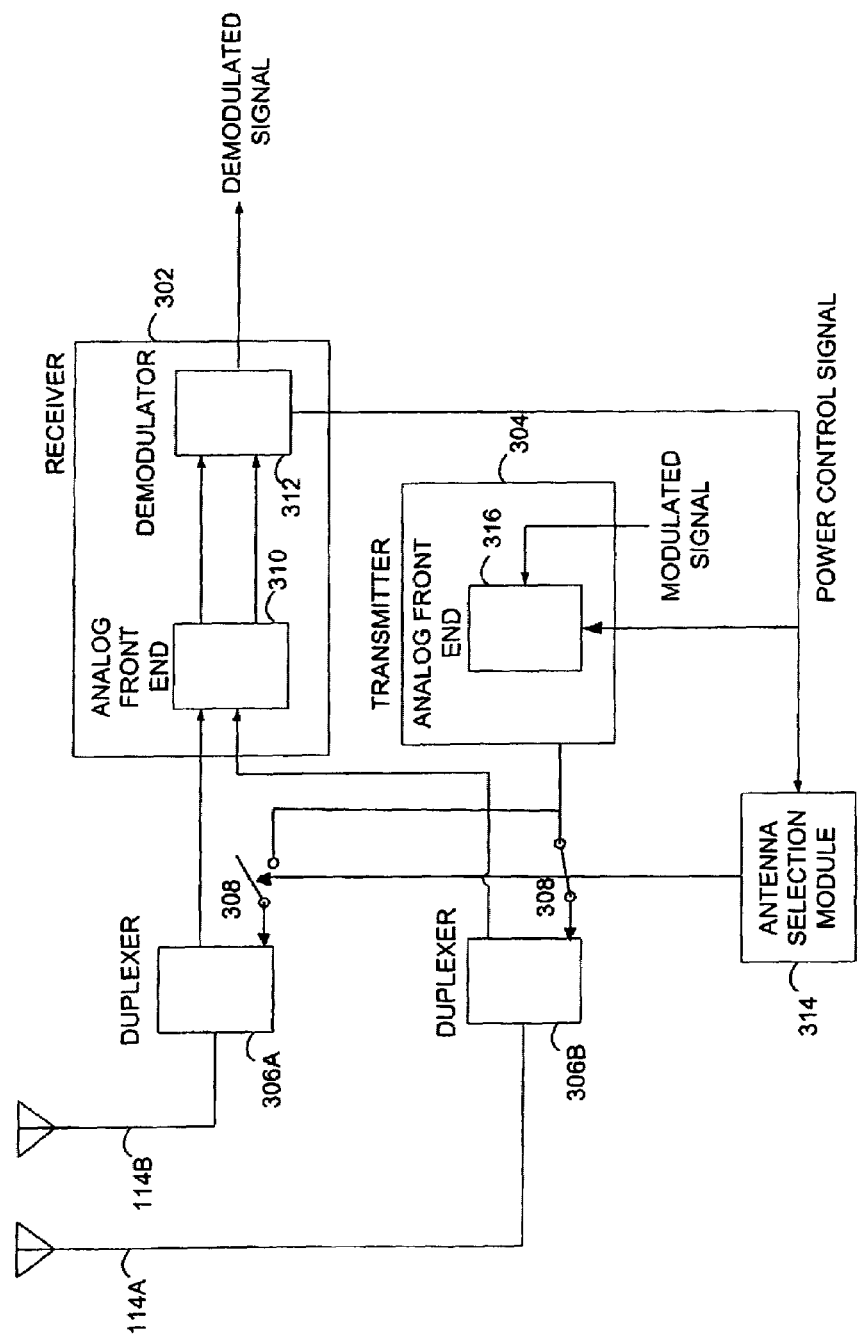
FIG. 3 is a simplified functional block diagram of an exemplary subscriber station with switched transmit antenna diversity.

FIG. 3 is a simplified functional block diagram of an exemplary subscriber station 108 with switched transmit antenna diversity. As explained earlier, the base station 104 uses two receive antennas 112A and 112B for reverse link reception, and therefore, achieves gain due to spatial diversity of the antennas 112A, 112B and the combining techniques utilized by the rake receiver (not shown). By employing switched transmit antenna diversity at the subscriber station 108 further improvements in reverse link signal quality may be achieved.

The subscriber station 108 includes a receiver 302 and transmitter 304 which share the same two transmit/receive antennas 114A and 114B. A separate duplexer 306A and 306B may be used to connect both the receiver 302 and the transmitter 304 to each transmit/receive antenna 114A and 114B. The duplexers 306A and 306B prevent transmitter leakage from desensitizing or damaging the receiver 302 while at the same time ensuring weak signals received by the transmit/receive antennas 114A and 114B are directed to the receiver 302. The receiver 302 may be coupled to both of the transmit/receive antennas 114A and 114B, and the transmitter 304 may be switched between the transmit/receive antennas 114A and 114B using a microwave switch 308 or similar device. A high intercept point microwave switch with good linearity may be used to reduce out-of-band emissions during high power transmissions. Both the receiver 302 and the transmitter 304 include various high frequency and signal processing components, however, only those components pertinent to the inventive concepts described throughout this disclosure will be discussed.

An analog front end 310 in the receiver 302 may be used to amplify, filter and downconvert the signals received by the transmit/receive antennas 114A and 114B to baseband signals. The baseband signals from the analog front end 310 may be separately demodulated and then combined with a rake receiver (not shown) in a demodulator 312. The power control signal may then be extracted from the combined signal and provided to an antenna selection module 314. In a manner to be described in greater detail later, the antenna selection module 314 may use the power control signal to control the switching of the transmitter 304 between the transmit/receive antennas 114A, 114B via duplexers 306A and 306B.

The power control signal may also be provided to the transmitter 304 to control the reverse link transmission power. In the exemplary embodiment shown in FIG. 3, a modulated signal may be provided to an analog front end 316 for filtering and upconversion to a carrier frequency suitable for transmission over the reverse link. A power amplifier (not shown) in the analog front end 316 of transmitter 304 may be used to generate a high power transmission. The power control signal from the demodulator 312 of receiver 302 may be provided to the power amplifier of analog front end 316 to control the reverse link signal gain. The reverse link signal transmission from the power amplifier of analog front end 316 may be switched to the appropriate transmit/receive antenna through the microwave switch 308 under control of the antenna selection module 314.

The antenna selection module 314 may be embodied in software capable of being executed on a general purpose processor, specific application processor, or in any other software execution environment. The software may reside in RAM memory, flash memory, ROM memory, EPROM memory, EEPROM memory, registers, a hard disk, a removable disk, a CD-ROM, or any other storage medium known in the art. Alternatively, the antenna selection module 314 may be embodied in hardware or in any combination of hardware and software. By way of example, the antenna selection module 314 may be an application specific integrated circuit (ASIC), a field programmable gate array (FPGA) or other programmable logic device, discrete gate or transistor logic, discrete hardware components, any combination thereof, or any other equivalent or nonequivalent structure designed to perform one or more of the described functions.

The purpose of the antenna selection module 314 in at least one embodiment of the subscriber station is to select an antenna for transmission that will result in the best reverse link signal quality. Because of signal fluctuations experienced by the base station 104 as the subscriber station 108 travels through the cellular region (or sector), the antenna capable of the best reverse link signal quality will vary with time. The antenna selection module 314 may use feedback from the base station 104 to select the transmit/receive antenna with the best reverse link signal quality. The actual procedure used to select the transmit/receive antenna may vary depending on a variety of factors such as cost and performance tradeoffs as well as other design constraints. In at least one embodiment of the antenna selection module 314, the power control signal may be used to gain insight into the reverse link signal quality. More specifically, if the power control signal indicates that the base station 104 is requesting more power, the antenna selection module 314 may switch the transmitter 304 to the other antenna 114A, 114B and monitor whether a decrease in power is requested by the base station 104 through the power control signal. A request for less power indicates that the reverse link signal quality from this selected antenna is better. This procedure may be continued for the duration of the call.

Figure 4:
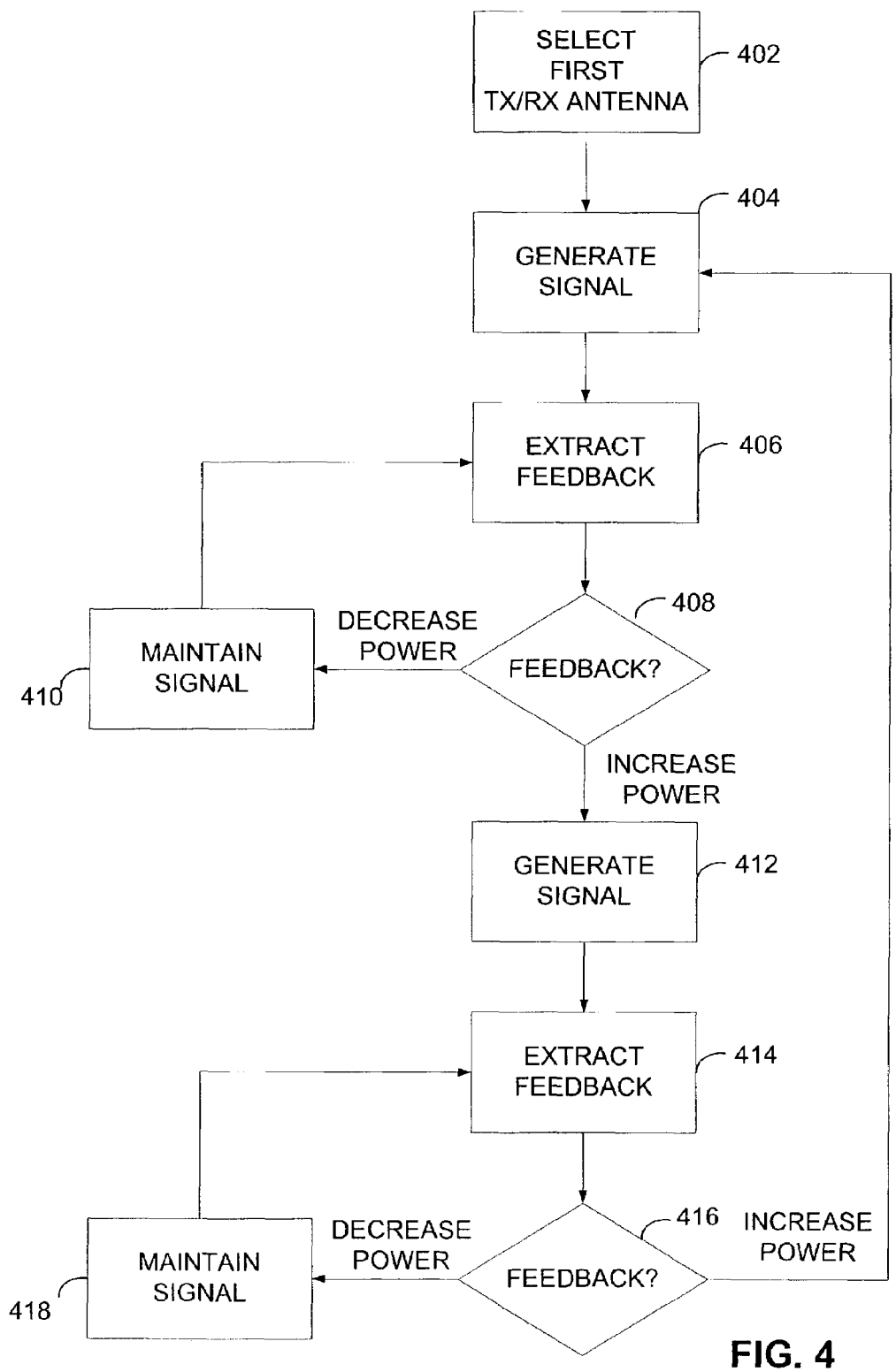
FIG. 4 is a flow chart illustrating an exemplary procedure implemented by an antenna selection module for switching a transmitter between two antennas.

FIG. 4 is a flow chart illustrating in more detail this exemplary procedure implemented by the antenna selection module for switching the transmitter 304 between the two antennas 114A, 114B. Initially, a first transmit antenna is selected in step 402. The initial selection of the first transmit antenna may be random, or may based on some other criteria. Next, a signal is generated in step 404 that may be used to connect the transmitter to the first transmit antenna. At this point, the subscriber station 108 is ready to transmit. In step 406, the antenna selection module 314 extracts feedback from the base station 104 relating to the reverse link transmission. The feedback in this case is the power control signal. If the antenna selection module 314 determines in step 408 that the power control signal is requesting a decrease in the reverse link power, then the signal used to connect the transmitter 304 to the first transmit antenna is maintained in step 410, and the antenna selection module 314 extracts the next power control signal in step 406.

Returning to step 408, if the antenna selection module determines that the power control signal is requesting an increase in the reverse link power, then the antenna selection module 314 generates a signal in step 412 to connect the transmitter to a second transmit/receive antenna. Once the transmitter is connected to the second transmit/receive antenna, the subscriber station is ready to transmit. In step 414, the antenna selection module 314 extracts the next power control signal relating to the reverse link transmission. If the antenna selection module 314 determines in step 416 that the power control signal is requesting a decrease in the reverse link power, then the signal used to connect the transmitter to the second transmit antenna is maintained in step 418, and the antenna selection module 314 extracts the next power control signal in step 414. Conversely, if the antenna selection module 314 determines in step 416 that the power control signal is requesting an increase in the reverse link transmission power, then the antenna selection module 314 generates a signal in step 404 to connect the transmitter 304 to the first transmit antenna.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, comprising:
transmitting a signal through a first antenna;
receiving feedback related to the signal transmission from a base station;
selecting between the first antenna and a second antenna as a function of the feedback; and
transmitting the signal through the selected antenna,
wherein the feedback comprises a parameter relating to the quality of the signal transmission through the first antenna, wherein the parameter comprises a power control signal, wherein the power control signal comprises a request to increase signal transmission power if the quality of the signal transmission through the first antenna is below a first threshold and a request to decrease signal transmission power if the quality of the signal transmission through the first antenna is above a second threshold, and wherein the first antenna is selected if the power control signal comprises the request to decrease the signal transmission power.

2. The method of claim 1 wherein the first threshold equals the second threshold.

3. The method of claim 1 wherein the first antenna is selected by coupling a transmitter to the first antenna through a first switch and decoupling the transmitter from the second antenna with a second switch, and wherein the second antenna is selected by decoupling the transmitter from the first antenna with the first switch and coupling the transmitter to the second antenna through the second switch.

4. The method of claim 1 further comprising receiving a signal through the first and second antennas.

5. The method of claim 4 wherein the received signal comprises the feedback.

6. A method of communications, comprising:
transmitting a signal through a first antenna;
receiving feedback related to the signal transmission from a base station;
selecting between the first antenna and a second antenna as a function of the feedback; and
transmitting the signal through the selected antenna,
wherein the feedback comprises a parameter relating to the quality of the signal transmission through the first antenna, wherein the parameter comprises a power control signal, wherein the power control signal comprises a request to increase signal transmission power if the quality of the signal transmission through the first antenna is below a first threshold and a request to decrease signal transmission power if the quality of the signal transmission through the first antenna is above a second threshold, and wherein the second antenna is selected if the power control signal comprises the request to increase the signal transmission power.

7. A communications apparatus, comprising:
first and second antennas adapted for transmitting signals;
an antenna selection module responsive to feedback from a base station, the feedback being related to a signal transmission; and
a transmitter selectively coupled between the first and second antennas under control of the antenna selection module.
wherein the feedback comprises a parameter relating to a quality of the signal transmission, wherein the parameter comprises a power control signal, wherein the transmitter comprises a gain responsive to the power control signal, and wherein the antenna selection module is configured to switch the transmitter from the first antenna to the second antenna if the power control signal comprises the request to increase the transmitter gain in response to the signal transmission through the first antenna.

8. The communications apparatus of claim 7 further comprising a first switch between the transmitter and the first antenna, and a second switch between the transmitter and the second antenna.

9. The communications apparatus of claim 8 wherein the antenna selection module is configured to close the first switch and open the second switch to couple the transmitter to the first antenna.

10. The communications apparatus of claim 8 wherein to antenna selection module is configured to open the first switch and close the second switch to couple the transmitter to the second antenna.

11. The communications apparatus of claim 7 wherein the power control signal comprises a request to increase the transmitter gain if the quality of the signal transmission is below a first threshold, and a request to decrease the transmitter gain if the quality of the signal transmission is below a second threshold.

12. The communications apparatus of claim 11 wherein the first threshold equals the second threshold.

13. The communications apparatus of claim 7 further comprising a receiver coupled to the first and second antennas.

14. The communications apparatus of claim 13 wherein the receiver is configured to receive a signal from the base station, the received signal comprising the feedback.

15. The communications apparatus of claim 14 further comprising a demodulator coupled to the receiver, the demodulator being configured to recover the feedback from the received signal and provide the recovered feedback to the antenna selection module.

16. The communications apparatus of claim 7 further comprising a first duplexer coupled to the first antenna, a first switch disposed between the transmitter and the first duplexer, a second duplexer coupled to the second antenna, a second switch disposed between the transmitter and the second duplexer, and a receiver coupled to the first and second duplexers, wherein the antenna selection module is configured to selectively couple the transmitter between the first and second antennas by controlling the first and second switches.

17. A communications apparatus, comprising:
first and second antennas adapted for transmitting signals;
an antenna selection module responsive to feedback from a base station, the feedback being related to a signal transmission; and a transmitter selectively coupled between the first and second antennas under control of the antenna selection module, wherein the feedback comprises a parameter relating to a quality of the signal transmission, wherein the parameter comprises a power control signal, wherein the transmitter comprises a gain responsive to the power control signal, and wherein the antenna selection module is configured to maintain the coupling between the transmitter and the first antenna if the power control signal comprises the request to decrease the transmitter gain in response to the signal transmission through the first antenna.

18. Computer readable media embodying instructions executable by a processor to perform a method comprising:
receiving feedback relating to a signal transmission from a base station;
selecting between a first antenna and a second antenna as a function of the feedback; and
generating a signal to couple a transmitter to the selected antenna,
wherein the feedback comprises a parameter relating to a quality of the signal transmission, wherein the parameter comprises a power control signal, wherein the power control signal comprises a request to increase signal transmission power if the quality of the signal transmission through the first antenna is below a first threshold and a request to decrease signal transmission power if the quality of the signal transmission through the first antenna is above a second threshold, wherein the feedback is based on the transmission from the first antenna, and wherein the selected antenna comprises the first antenna if the power control signal comprises the request to decrease the signal transmission power.

19. The computer readable media of claim 18 wherein the first threshold equals the second threshold.

20. Computer readable media embodying instructions executable by a processor to perform a method comprising:
receiving feedback relating to a signal transmission from a base station;
selecting between a first antenna and a second antenna as a function of the feedback; and
generating a signal to couple a transmitter to the selected antenna, wherein the feedback comprises a parameter relating to a quality of the signal transmission, wherein the parameter comprises a power control signal, wherein the power control signal comprises a request to increase signal transmission power if the quality of the signal transmission through the first antenna is below a first threshold and a request to decrease signal transmission power if the quality of the signal transmission through the first antenna is above a second threshold, wherein the feedback is based on the transmission from the first antenna, and wherein the selected antenna comprises the second antenna if the power control signal comprises the request to increase the signal transmission power.

21. A communications apparatus, comprising:
first and second antennas;
means for selecting between the first and second antennas as a function of feedback received from a base station, the feedback being related to a signal transmission;
a transmitter; and
means for coupling the transmitter to the selected antenna,
wherein the feedback comprises a parameter relating to a quality of the signal transmission, wherein the parameter comprises a power control signal, wherein the transmitter comprises a gain responsive to the power control signal, wherein the power control signal comprises a request to increase the transmitter gain if the quality of the signal transmission is below a first threshold, and a request to decrease the transmitter gain if the quality of the signal transmission is above a second threshold, and wherein the means for selecting between the first and second antennas is configured to select the second antenna if the power control signal comprises the request to increase the transmitter gain in response to the signal transmission through the first antenna.

22. The communications apparatus of claim 21 wherein the means for coupling the transmitter to the selected antenna comprises a first switch between the transmitter and the first antenna, and a second switch between the transmitter and the second antenna.

23. The communications apparatus of claim 21 wherein the first threshold equals the second threshold.

24. The communications apparatus of claim 21 further comprising a receiver coupled to the first and second antennas.

25. The communications apparatus of claim 24 wherein the receiver is configured to receive a signal from the base station, the received signal comprising the feedback.

26. The communications apparatus of claim 25 further comprising means for recovering the feedback from the received signal.

27. A communications apparatus, comprising:
first and second antennas;
means for selecting between the first and second antennas as a function of feedback received from a base station, the feedback being related to a signal transmission;
a transmitter; and
means for coupling the transmitter to the selected antenna,
wherein the feedback comprises a parameter relating to a quality of the signal transmission, wherein the parameter comprises a power control signal, wherein the transmitter comprises a gain responsive to the power control signal, wherein the power control signal comprises a request to increase the transmitter gain if the quality of the signal transmission is below a first threshold, and a request to decrease the transmitter gain if the quality of the signal transmission is above a second threshold, and wherein the means for selecting between the first and second antennas is configured to select the first antenna if the power control signal comprises the request to decrease the transmitter gain in response to the signal transmission through the first antenna.

* * * * *